US007430614B2

(12) United States Patent
Shen et al.

(10) Patent No.: US 7,430,614 B2
(45) Date of Patent: Sep. 30, 2008

(54) USE OF IP ADDRESS BLOCKS WITH DEFAULT INTERFACES IN A ROUTER

(75) Inventors: Naiming Shen, San Jose, CA (US); Kishore K. Seshadri, Saratoga, CA (US)

(73) Assignee: Redback Networks, Inc., San Jose, CA (US)

( * ) Notice: Subject to any disclaimer, the term of this patent is extended or adjusted under 35 U.S.C. 154(b) by 734 days.

(21) Appl. No.: 10/954,395

(22) Filed: Sep. 29, 2004

(65) Prior Publication Data

US 2005/0097223 A1 May 5, 2005

Related U.S. Application Data

(60) Provisional application No. 60/516,200, filed on Oct. 31, 2003.

(51) Int. Cl.
*G06F 15/16* (2006.01)
(52) U.S. Cl. .................. 709/245; 340/825.52; 370/474; 370/475
(58) Field of Classification Search .................. 709/245
See application file for complete search history.

(56) References Cited

U.S. PATENT DOCUMENTS 6,944,167 B1 * 9/2005 McPherson .................. 370/401

2004/0139226 A1 * 7/2004 Margalit et al. ............. 709/245

OTHER PUBLICATIONS

R. Droms, rfc 2131 "Dynamic Host Configuration Protocol", Mar. 1997, IETF Network Working Group, 45 pages.*
Patrick, M., "DHCP Relay Agent Information Option," Network Working Group, Jan. 2001, 14 pp.
Droms, R., "Dynamic Host Configuration Protocol," Network Working Group, Mar. 1997, 45 pp.

* cited by examiner

*Primary Examiner*—Yves Dalencourt
*Assistant Examiner*—Michael C Lai
(74) *Attorney, Agent, or Firm*—Blakely Sokoloff Taylor & Zafman LLP

(57) ABSTRACT

The use of IP address blocks with default interfaces in a router is described herein. According to one embodiment, an exemplary method includes in response to a request for a first IP address received from a first client at an interface of the network element, assigning the first client an IP address from a first block of IP addresses dynamically allocated from an IP address provider separated from a pool of statically preassigned IP addresses, if there is no IP address remained unassigned in the pool of statically preassigned IP addresses, and advertising reachability information in a network with respect to the first block of the IP addresses dynamically allocated from the IP address provider, such that other entities of the network are aware of the first block of the IP addresses. Other methods and apparatuses are also described.

23 Claims, 6 Drawing Sheets

USE OF IP ADDRESS BLOCKS WITH DEFAULT INTERFACES IN A ROUTER

This application claims the benefit of U.S. Provisional Application No. 60/516,200, filed Oct. 31, 2003, which is hereby incorporated by reference.

FIELD OF THE INVENTION

The present invention relates generally to communications. More particularly, this invention relates to a use of IP address blocks with default interfaces in a router.

BACKGROUND OF THE INVENTION

In the field of communications, the need for high-speed transmission of data, including video and audio, has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a Plain Old Telephone Service (POTS) line. Other choices for connection, which are at higher speeds, into a network can include Integrated Services Digital Network (ISDN), Digital Subscriber Line (DSL) service, and cable modem service over a Radio Frequency (RF) cable line. Further, other types of content providers may enable a subscriber to receive different types of media, such as a video stream, audio stream, etc.

In a typical DSL network, a network element supports a wide variety of features to facilitate the management, allocation and distribution of IP addresses. Normally, the subscriber profile can be configured locally on the network element or can be retrieved from a remote server (e.g., a RADIUS (remote access dial in user server)). A subscriber profile determines how an IP address (and optionally the associated route for the subscriber LAN) would be provided to a certain subscriber. Similarly, a cable modem user uses a DHCP server to allocate IP addresses for the clients.

Traditionally, the IP addresses provided to the subscribers must exist within the IP address/subnet "boundary" of an interface. That is, an interface must "contain" or "subtend" the IP addresses that are being provided to subscribers. The network element only has to advertise (e.g., perform network broadcast) for the interfaces (not each IP address assigned to each interface). However, since those IP addresses are pre-provisioned in relatively large blocks, it is not uncommon for them to be unused IP addresses (an IP address assigned a subnet that is not assigned to a subscriber due to a lack of demand cannot be used by another router). This is unfortunate because IP addresses can be a scarce resource.

When the IP addresses are not adequate, a default interface, also referred to as interface of last resort, may be used to provide additional IP addresses. In the default interface configuration, the IP addresses provided to the subscribers do not have to exist within IP address/subnet boundary of an interface. That is, the IP addresses provided to the subscribers are decoupled from the interface(s) definition. This allows a single IP subnet to be fully allocated and to be shared across multiple routers. However, the network element has to perform network broadcast for each IP address handed out as an interface of last resort. As a result, large amount of network traffic is generated. In addition, the IP address provider (e.g., DHCP or RADIUS) has to handle each individual IP address request as a last resort, which leads to a heavy load on the IP address provider.

Typically, there are two major approaches to provide IP addresses to the subscribers, traditional approach and a default interface (interface of last resort) approach.

Traditional Approach

This approach is more appropriate for a centralized aggregation model (e.g., BRAS). Utilizing the traditional approach, the following methods are supported on a network element to manage/allocate IP addresses to the subscribers:

1) Static Bridge-1483 encapsulated subscribers: Static IP addresses are allocated to these subscribers. Subscriber-specific static routes (usually for the subscriber LAN) can also be assigned.
2) DHCP Bridge-1483 subscribers: IP addresses are allocated to these subscribers utilizing an external or on-board DHCP server.
3) PPP-encapsulated subscribers: A statically or dynamically allocated IP address can be assigned per PPP session. A subscriber-specific static route (usually for the subscriber LAN) can also be assigned at session bring-up time.
4) Route-1483 encapsulated subscribers: Static IP addresses are allocated to these subscribers. A subscriber-specific static route (usually for the subscriber LAN) can also be assigned.

In all cases above, an IP interface is configured on the network element that "contains" the IP addresses that are being assigned to the subscribers. For example, following interface may be defined on the network element, or if multiple virtual routers are supported, in a given context (a virtual router or a physical router):

Interface Subscribers
IP address 10.10.10.1 255.255.255.0

The IP addresses assigned to the subscribers (whether static, DHCP or PPP) fall within a range of 10.10.10.2-10.10.10.254. In summary, the IP addresses provided to the subscribers are dependent on the interface(s) configured on the network element.

Default Interfaces or Interfaces of Last Resort

This approach is more commonly used in a more distributed aggregation model. It has also been traditionally used for PPP encapsulated subscribers in a Remote Access dial-up environment. The default interface feature of the network element would provide the capability to decouple IP address assigned to a session from the interface IP address/subnet mask definition. The application of this feature to PPP-encapsulated subscribers would be equivalent to the PPP-default interface feature on the network element. Default Interfaces are applicable to both PPP-encapsulated and CLIPs-encapsulated subscribers.

The default interface for PPP subscribers may be configured to provide PPP sessions an interface to which they can bind in case no other valid interface exists (e.g., a valid interface is one whose IP subnet "contains" the IP address of the subscriber) on a system. Hence also the name: "interface of last resort". Normally, a PPP session that cannot bind to an interface (due to lack of an interface with a valid matching IP range) simply fails the binding. With the use of default interfaces, this PPP session will instead bind to the interface designated as a "default" interface. The default interface in this instance acts as an interface of last resort. By using such a design, there is no requirement to have all subscribers terminated on a single router interface be assigned addresses from a common IP subnet. This allows for an IP subnet to be shared across many router devices. This allows the service provider to more fully utilize the IP address space allocated to them, as there are no wasted addresses due to allocation inefficiencies (however, IP addresses assigned to a subnet interface may still go unused depending on demand). It also allows the service provider to build redundancy into the access network, provided there is a means to reroute subscriber sessions to a standby router. The default interface works in a similar manner as described above except that the server involved here would be the DHCP server.

SUMMARY OF THE INVENTION

The use of IP address blocks with default interfaces in a router is described herein. According to one embodiment, an exemplary method includes in response to a request for a first IP address received from a first client at an interface of the network element, assigning the first client an IP address from a first block of IP addresses dynamically allocated from an IP address provider separated from a pool of statically preassigned IP addresses, if there is no IP address remained unassigned in the pool of statically preassigned IP addresses, and advertising reachability information in a network with respect to the first block of the IP address dynamically allocated from the IP address provider, such that other entities of the network are aware of the first block of the IP addresses. Other methods and apparatuses are also described.

DESCRIPTION OF THE DRAWINGS

The present invention is illustrated by way of example and not limitation in the figures of the accompanying drawings in which like references indicate similar elements.

DETAILED DESCRIPTION

Figure 1:
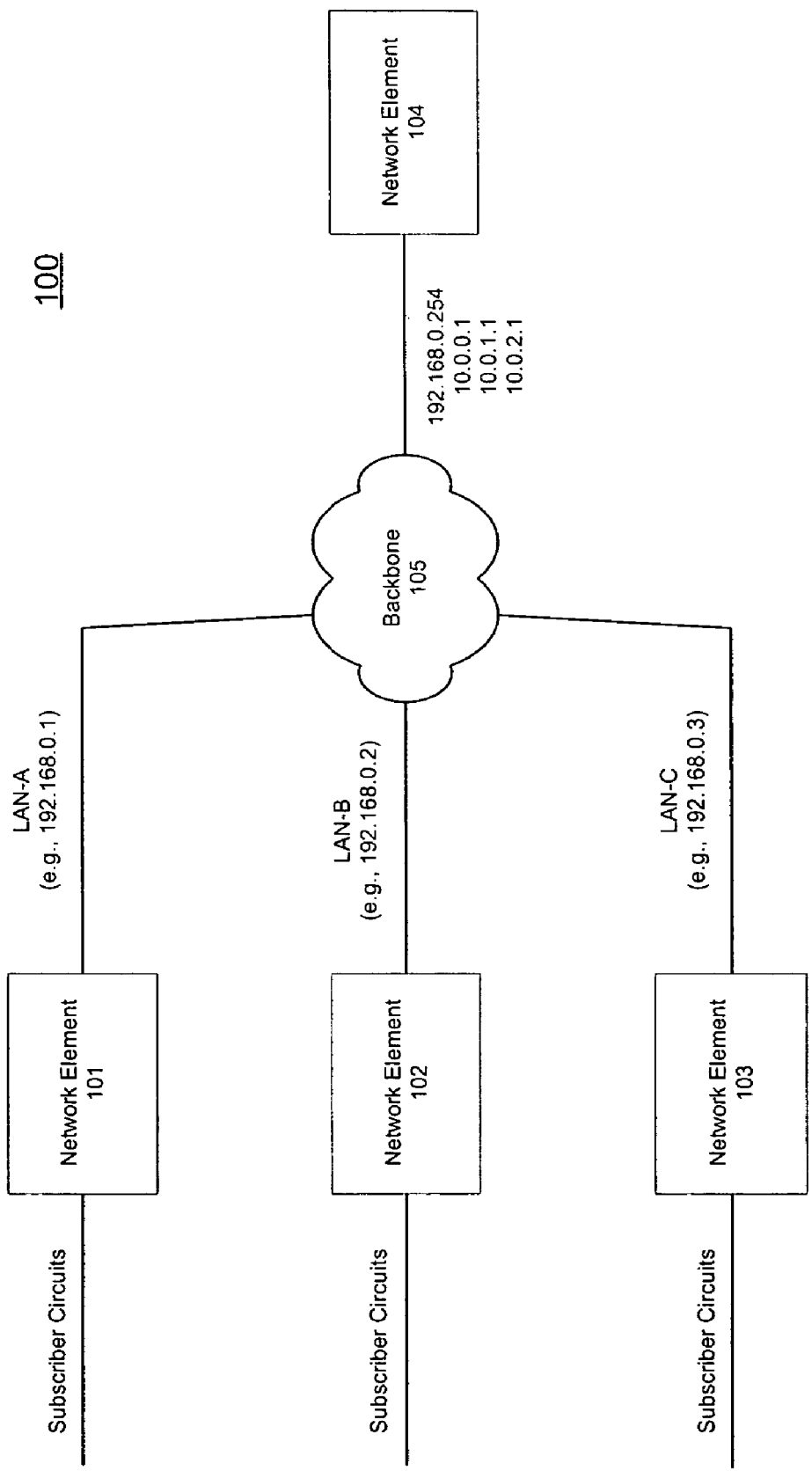
FIG. 1 is a diagram illustrating a typical network infrastructure.

The use of IP address blocks with default interfaces in a router is described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent finite sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to one or more different apparatuses for performing the operations herein. This apparatus may be specially constructed for the required purposes (e.g., software, hardware, and/or firmware, etc.), or it may comprise a general purpose computer selectively activated or reconfigured by a computer program stored in the computer. The computer readable medium can be physical/storage media or transmission media instructions of such software, firmware, and computer programs may be stored in a machine readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards or transmission media such as: electrical, optical, acoustical or other forms of propagated signals (e.g., carrier waves, infrared signals, etc.) or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

An Exemplary Network

FIG. 1 is a block diagram of a network configuration according to one embodiment of the invention. In one embodiment, no IP address block(s) is needed to be preassigned. The addresses can be assigned to subscribers with no regard for the network element on which that subscriber's session is terminated. In the example shown in FIG. 1, the subscriber session can be terminated on any one of the three units 101-103, in spite of the fact that there is no valid matching interface on any of the systems 101-103.

Referring to FIG. 1, according to one embodiment, as an example, four network element units 101-104 are set up on an Ethernet segments. However, it is not limited so. Units 101-104 are configured as access systems with default interfaces. Unit 104 serves as the upstream router. The backbone interconnecting the four units may be a broadcast multi-access network, such as, for example, an Ethernet.

Note that the subscriber's address has no corresponding interfaces that would normally be considered a "match". With this configuration, a subscriber can be terminated on any of the three network element units: A, B or C with an address in any of the 10.0.0.1, 10.0.1.1 and 10.0.2.1 subnets. All subscribers bound to the default interface appear to unit D to be directly connected to the backbone network.

Once binding is successful, the backbone router needs to be able to send packets to the newly bound subscriber. One way is to distribute host routes via an Interior Gateway Protocol, such as OSPF or IS-IS, or an exterior gateway protocol such as BGP. A second way is to use proxy-ARP in conjunction with secondary addressing on the aggregation router.

The first method involving the use of routing protocols to distribute host routes. In this model, an interface is flagged as 'default' and all subscribers with no matching valid interfaces bind to this default interface. The network element can then be configured to distribute all the reachability information in the form of host routes in a routing protocol. The backbone learns the existence and location of each of the hosts by means of the routing protocol. Routes to hosts that bind to the default interface are treated as subscriber routes. Injecting these routes into the routing protocol requires the administrator to configure redistribution of subscriber routes. One of the advantages of this approach is that there is no requirement to run Proxy-ARP and the administrator has full Layer 3 visibility into each flow at all times. The individual PPP session's IP address will appear as a host entry in the routing table where the session terminates and can be redistributed into a dynamic routing protocol at that point. Proper network design would have a common upstream router summarize these host routes prior to advertising the routes into the backbone.

For the second method, in addition to the default designation, proxy ARP may be configured on another interface to provide IP reachability. Referring to FIG. 1, this is done on the backbone interface for each network element (LAN-A, LAN-B and LAN-C). Interfaces with this command enabled will Proxy-ARP (i.e. generate ARP responses for ARP requests) for any IP address assigned to a PPP session terminated on the default interface on that unit. The backbone router is configured with secondary addresses on the B-RAS/router facing side of the device. An exemplary configuration for unit D of FIG. 1 may be defined as follows:

Configuration of Unit D:
interface RAS
  ip address 192.168.0.254 255.255.255.0
  ip address 10.0.0.1 255.255.255.0 secondary
  ip address 10.0.1.1 255.255.255.0 secondary
  ip address 10.0.2.1 255.255.255.0 secondary
  ip arp arpa This setup allows users to complete their PPP sessions on any of multiple network element units without concern for the specific unit on which their session terminates.

Exemplary Address Microblocking

Method 1 above involving the use of routing protocols to distribute host routes is the more commonly used approach to deal with default interfaces. This creates a problem in that a large number of host routes (/32s) have to be carried in the routing protocol. This number could be as many as 500,000 routes in a single region. While sometimes this level of scaling is not a problem on the network element, it could cause problems on other routers in the network. Reducing the number of routes carried by the routing protocol is highly desirable. A second issue with routing is that subscribers logging on and off the network results in frequent routing protocol updates which effects the backbone routing convergence and quality. Devices on the network other than the network element may also have issues related to the handling of frequent route updates and with having to frequently rerun their algorithms to achieve convergence.

Figure 2:
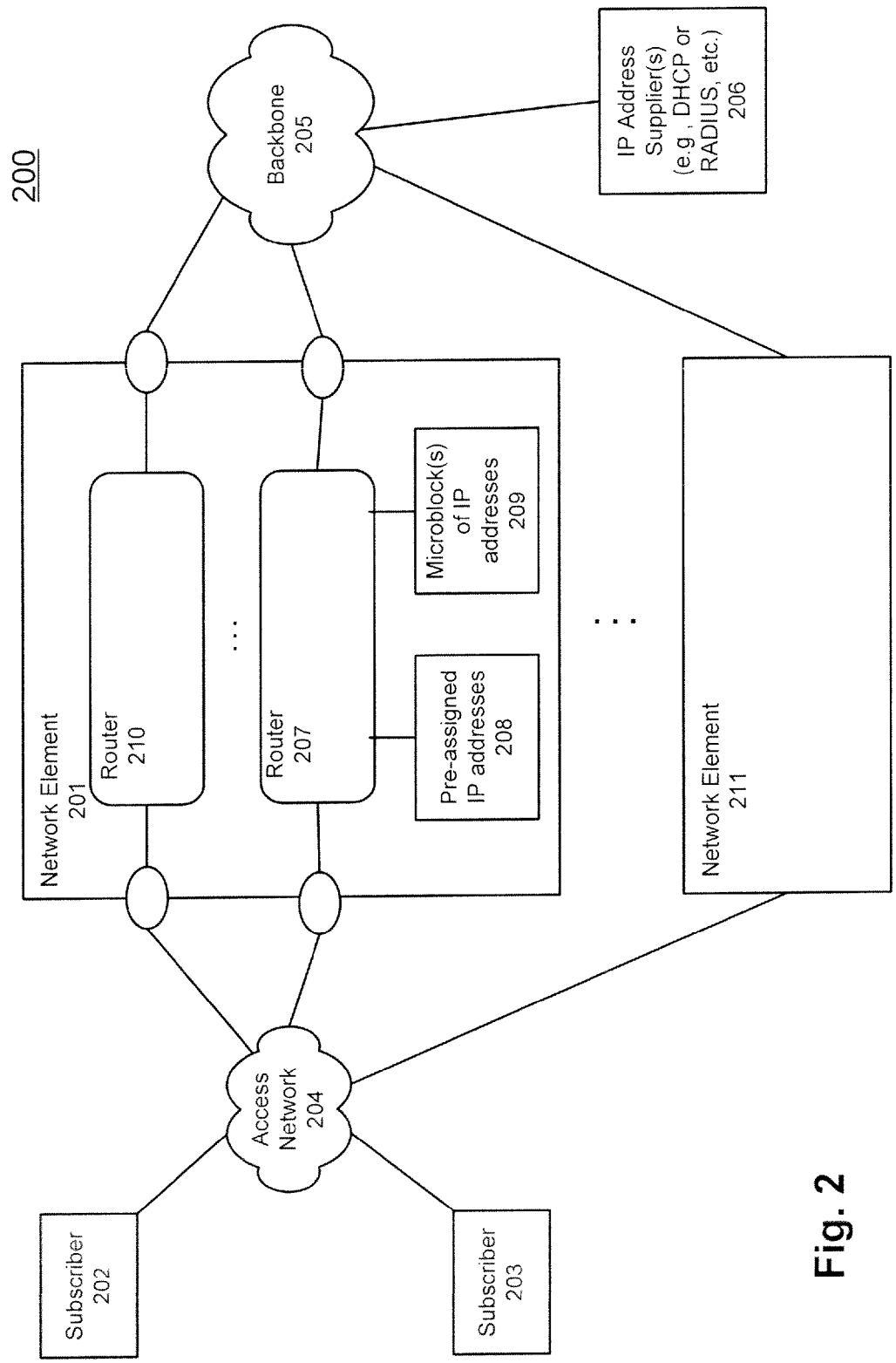
FIG. 2 is a diagram illustrating an exemplary network infrastructure according to one embodiment of the invention.

According to one embodiment, one approach to address this problem is via the use of address microblocks when performing address allocation on an IP address provider or supplier, such as, for example, a RADIUS or DHCP server, according to one embodiment. FIG. 2 is a block diagram illustrating an exemplary network configuration according to one embodiment of the invention. In one embodiment, exemplary network configuration 200 includes, but not limited to, one or more network elements 201 and 211, where each network element receives one or more subscribers, such as subscribers 202 and 203 via access network 204 a request for an IP address, which may be handled through one or more routers 207, which may be contexts or virtual routers or physical routers of network element 201. Typically, prior to servicing subscribers 202 and 203, network element 201 has been statically assigned a range of IP address to form one or more preallocated interfaces, also referred to as preassigned IP addresses 208, from an IP address provider or supplier 206 through backbone, such as, for example, a DHCP server or a RADIUS. When network element 201 receives such a request, typically network element 201 hands out an IP address to the client from the preassigned IP address pool 208, or alternatively, from one or more microblocks of IP addresses 209, which have been dynamically assigned to network element 201 as a default interface or an interface of last resort, when no more preassigned IP address is available or an AAA process (performed by a RADIUS) could not match the user information with one of the preallocated interfaces. When the client release an IP address, network element 201 releases the respective IP address back to preassigned IP address pool or microblock IP address pool. Once all of the IP addresses in microblock IP address pool have been released, network element 201 may release the whole microblock of IP addresses back to IP address provider 206 for future use. The released microblock of IP addresses may be reused by other network elements, such as network element 211, when another network element needs to allocate a default interface for its clients. As a result, multiple network elements (e.g., network elements 201 and 211) may share the same pool of IP addresses provided by IP address provider 206 for their respective default interface.

In one embodiment, the RADIUS or DHCP server (whichever is being used to perform address allocation, depending on the encapsulation in use) allocates addresses to the router in microblocks. For example, a RADIUS server capable of supporting address microblocking will perform at least one of the following operations upon receiving a receiving an authentication request from a certain router:

Return an address for the subscriber session being terminated on that router

Return a VSA (vendor specific attribute) in the Authentication response that informs the router that: a) address microblocking is in use on the RADIUS server, and b) the block size used in microblocking Allocate a block of adjacent addresses out of a microblock (e.g. size 8) to be returned when responding to future authentication requests from that router.

This causes each router to be assigned microblocks of IP addresses. In one embodiment, the subscriber routes assigned in this manner can be tagged as a special route type, such as, for example, subscriber-summary routes. The special route type can be used in enforcing policy decisions when distributing routes. When these types of routes are distributed via the routing protocol, the summary route with the specified microblocking prefix length is advertised. If a router does not understand the microblocking RADIUS VSA, it should ignore the attribute and distribute /32 addresses. The router will also black-hole all packets addressed to addresses in the micro-block that have yet to be assigned to a subscriber. Thus for example, using a microblock size of 8 could reduce the number of routes distributed by a router via the routing protocol by as much as a factor of 8.

In the case of DHCP and CLIPs subscribers, according to one embodiment, the relay-agent or DHCP proxy may send an Option 82 field indicating a microblocking capability when relaying a request. In a particular embodiment, this would include a sub-option of "microblocking" with prefix-length of zero. The DHCP server upon receipt of this Option 82 field (if it supports microblocking) may fill in the sub-option with the correct prefix-length. If the relay-agent does not send this sub-option or option 82, then the DHCP server does not need to send this information in its response.

When there is a requirement to support changes in block size on the DHCP or RADIUS server, according to one embodiment, intelligence may be built into fragment address blocks only as the block of addresses is entirely freed up, either via DHCP lease expiration or via subscribers logging off and terminating their sessions.

Figure 3:
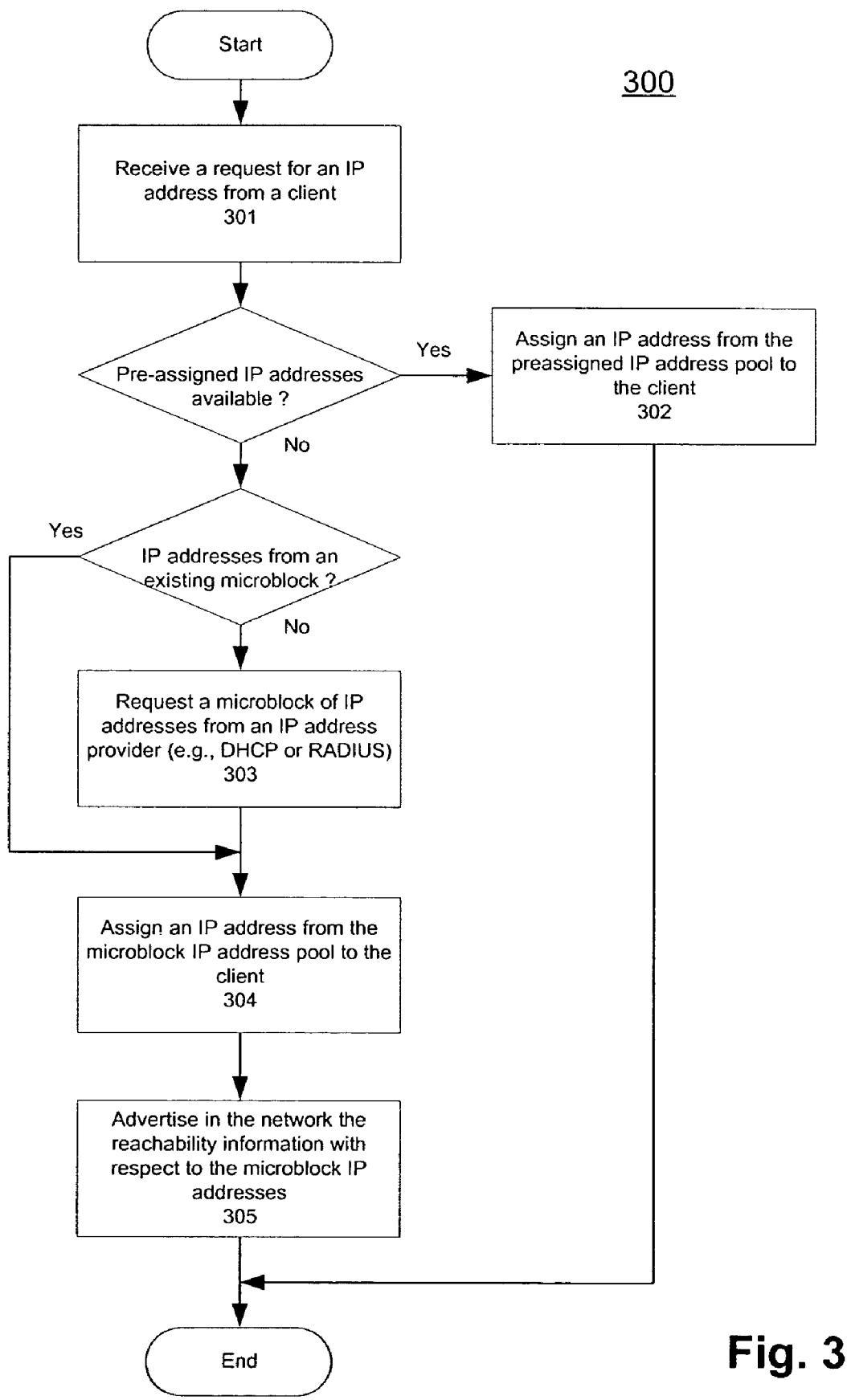
FIG. 3 is a flow diagram illustrating an exemplary process for processing a request for an IP address according to one embodiment of the invention.

FIG. 3 is a flow diagram illustrating an exemplary process for processing a request for an IP address according to one embodiment of the invention. Referring to FIGS. 2 and 3, at block 301, when network element 201 receives a request for an IP address from a client, network element 201 determines whether there is a preassigned IP address available from preassigned IP address pool 208. If there is at least one preassigned IP address from the preassigned IP address pool 208, at block 302, network element 201 assigns an IP address from the preassigned IP address pool 208 to the client.

If there is no more preassigned IP address available, network element 201 determines whether there is at least one IP address in an existing microblock of IP address, which previously dynamically allocated to network element 201 as a default interface. If there is at least one IP address from an existing microblock IP address pool 209, at block 304, network element 201 assigns an IP address out of microblock IP address pool 209. If there is no more IP address available from microblock IP address pool 209 or there is no microblock IP address ever allocated, at block 303, network element 201 may send a request to IP address provider 206 via backbone for a microblock of IP addresses and assign one of the IP addresses in the newly allocated block to the client. Thereafter, at block 305, network element 201 may advertise the reachability information with respect to the block of IP addresses.

It will be appreciated that address microblocking and default interfaces can also be used together with the subscriber binding capability on the network element to provision business customers via unnumbered interfaces on the network element. The RADIUS server can be used to inform the network element about the subscribers IP networks via the Framed-IP-Route attribute. These routes are then installed in the route table as being reachable via the unnumbered default interface.

Figure 4:
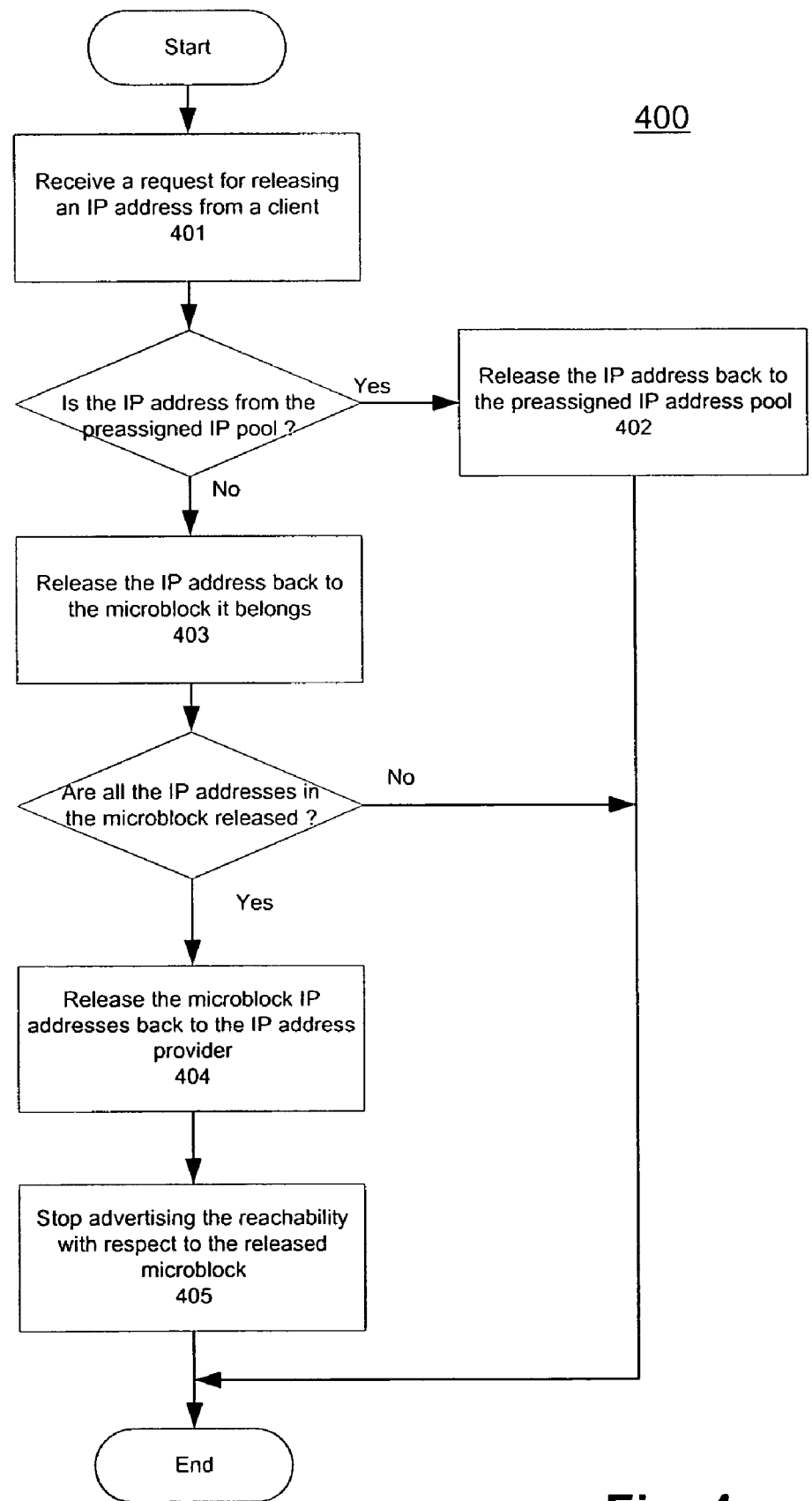
FIG. 4 is a flow diagram illustrating an exemplary process for processing a request for releasing an IP address according to one embodiment of the invention.

FIG. 4 is a flow diagram illustrating an exemplary process for releasing an IP address according to one embodiment. Referring to FIGS. 2 and 4, at block 401, when network element 201 receives a request for releasing an IP address previously allocated to a client, network element 201 determines whether the respective IP address was allocated from preassigned IP address pool 208. If the respective IP address was allocated from preassigned IP address pool 208, at block 402, network element 201 releases the IP address back to preassigned IP address pool 208 for future use. If the respective IP address was not allocated from preassigned IP address pool 208, at block 403, network element 201 releases the IP address back to the microblock of IP addresses 209 where it belongs. In addition, network element 201 determines whether all IP addresses in the corresponding microblock of IP addresses have been released. If so, at block 404, network element 201 releases the whole microblock of IP addresses back to IP address provider 206 and at block 405, network element 201 stops advertising the reachability information in the network with respect to the released microblock of IP addresses. Other operations may be included.

Figure 5:
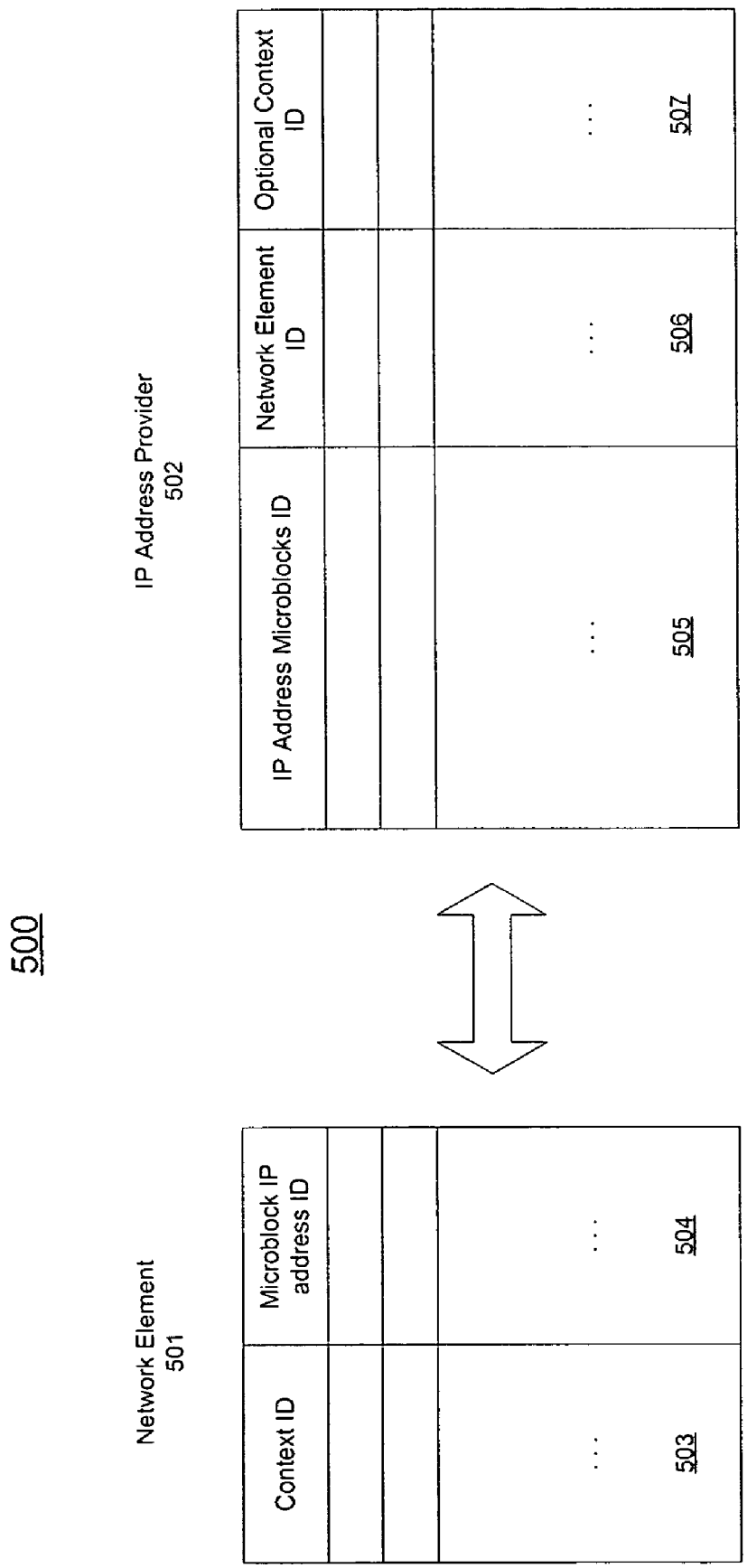
FIG. 5 is a block diagram illustrating an exemplary data structure which may be used in one embodiment of the invention.

In one embodiment, when IP address provider 206 allocates a microblock of IP addresses to network element 201, the microblock of IP addresses may be defined to include a start address and the length of the microblock. FIG. 5 is a block diagram illustrating data structures maintained by a network element and an IP address provider, according to one embodiment. In one embodiment, data structure 501 maintained by a network element may include context ID field 503 and microblock address ID field to indicate which microblock IP addresses is being used by which context or virtual router. Data structure 501 may be implemented as microblock of IP addresses 209 of FIG. 2. Similarly, an IP address provider, such as IP address provider 206, also maintains a data structure 502 to maintain information regarding microblocks of IP addresses allocated. In one embodiment, data structure 502 may include microblock IP address ID field 505 and network element ID field to indicate which microblock of IP addresses has been assigned to which network element.

Referring to FIGS. 2 and 5, according to one embodiment, when network element 201 receives a microblock of IP addresses from IP address provider 206, the microblock includes, but not limited to, a start address and a length of the microblock indicating number of IP addresses in the microblock. In one embodiment, the length of the microblock is indicated by a prefix length of network address, similar to a mask, as exemplary IP address 600 shown in FIG. 6.

Figure 6:
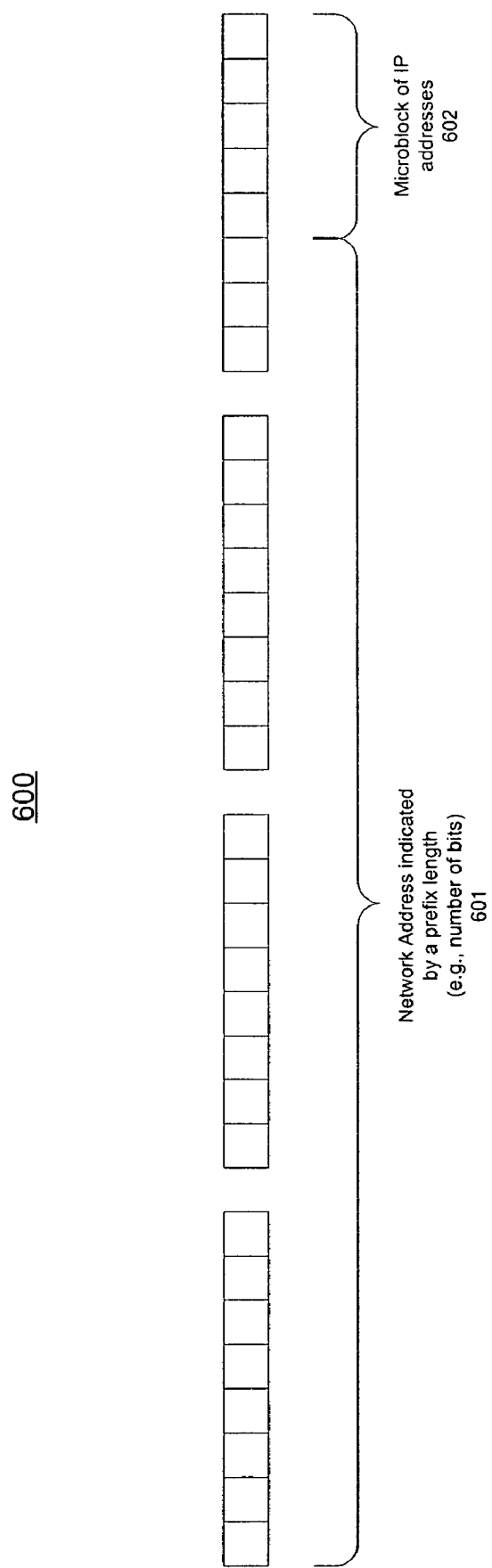
FIG. 6 is a block diagram illustrating an exemplary IP address configuration according to one embodiment of the invention.

For example, referring to FIG. 6, the length of the microblock of IP addresses is specified by a prefixed length of a network address 601 indicating how many bits of the address are used for the network address. The remaining bits 602 indicate the length or size of the microblock. In this example, the remaining bits have 5 bits which may be translated to 32 IP addresses (included in a microblock). It will be appreciated that other mechanisms may be used to indicate the start address and the size of the microblock.

Thus, the use of default interfaces allows for a simple provisioning model where scarce IP addresses can be fully utilized. Further the use of microblocking on RADIUS and DHCP servers in conjunction with support on the router greatly reduces the impact of using such default interfaces on systems and the routing protocols. Address microblocking also reduces the amount of state that has to be carried in routing protocols as well as the frequency of updates. All these factors result in a more scalable, flexible and stable network.

Thus, the use of IP address blocks with default interfaces in a router has been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a network clement, comprising:
   in response to a request for a first IP address received from a first client at an interface of the network clement over an access network, assigning the first client an IP address from a first block of IP addresses dynamically allocated from an IP address provider separated from a pool of statically preassigned IP addresses, if there is no IP address remained unassigned in the pool of statically preassigned IP addresses specifically allocated to the interface, wherein the network element comprises a plurality of interfaces, each interface being associated with a plurality of clients coupled over the access network, wherein each interface is statically allocated with a predetermined range of globally unique IP addresses that can be assigned to any of the clients associated with each interface, and wherein a block of IP addresses is dynamically allocated as a logical interface of a last resort only if there is no statically preassigned IP address corresponding to particular interface available; and
   advertising reachability information in a network with respect to the first block of the IP addresses dynamically allocated from the IP address provider, such that other entities of the network are aware of the first block of the IP addresses.

2. The method of claim 1, wherein the IP address provider is one of a DHCP server and a RADIUS server coupled to the network element via a backbone.

3. The method of claim 1, wherein the interface is a default interface of the network element.

4. The method of claim 1, further composing:
   determining whether there is at least one IP address available from the pool of statically preassigned IP addresses; and
   dynamically allocating the first block of IP addresses from the IP address provider if there is no IP address available from the pool of statically preassigned IP addresses.

5. The method of claim 1, further comprising:
   receiving from a second client a request for releasing a second IP address previously allocated from the first block of IP addresses; and
   releasing the second IP address back to the first block of IP addresses without invoking the IP address provider.

6. The method of claim 5, further comprising:
   receiving a request for allocating a third IP address from a third client; and
   reassigning the second IP address from the first block of IP addresses to the third client without invoking the IP address provider.

7. A method performed by a network element, comprising:
   in response to a request for a first IP address received from a first client at an interface of the network element,
   determining whether there is at least one IP address available from a pool of statically preassigned IP addresses;
   determining whether a second block of IP addresses has been previously dynamically allocated from the IP address provider in response to a previous request for an IP address if there is no IP address available from the pool of statically preassigned IP addresses; and
   assigning an IP address from the second block of IP addresses previously allocated if the second block of IP addresses exists and contains at least one IP address available;
   dynamically allocating a first block of IP addresses from an IP address provider if there is no IP address available from the pool of statically preassigned IP addresses and there is no IP address available from the second block;
   assigning the first client an IP address from the first block of IP addresses dynamically allocated from tile IP address provider separated from a pool of statically preassigned IP addresses;
   advertising reachability information in a network with respect to the first block of the IP address dynamically allocated from the IP address provider, such that other entities of the network arc aware of the first block of the IP addresses.

8. The method of claim 7, wherein the first block of IP addresses is dynamically allocated only if the second block of IP addresses does not exist.

9. The method of claim 7, wherein the first block of IP addresses is dynamically allocated only if the second block of IP addresses does not contain at least one IP address available.

10. A method performed by a network element, comprising:
    in response to a request for a first IP address received from a first client at an interface of the network element, assigning the first client an IP address from a first block of IP addresses dynamically allocated from an IP address provider separated from a pool of statically preassigned IP addresses, if there is no IP address remained unassigned in the pool of statical preassigned IP addresses.
    advertising reachability information in a network with respect to the first block of the IP addresses dynamically allocated from the IP address provider, such that other entities of the network are aware of the first block of the IP addresses;
    receiving from a second client a request for releasing a second IP address previously allocated from the first block of IP addresses;
    releasing the second IP address back to the first block of IP addresses without invoking the IP address provider;
    determining whether all IP addresses of the first block of IP addresses have been released; and
    releasing the first block of IP addresses back to the IP address provider if all IP addresses of the first block of IP addresses have been released.

11. A machine-readable storage medium having executable code to cause a machine to perform a method, the method comprising:
    in response to a request for a first IP address received from a first client at an interface of the network element, assigning the first client an IP address from a first block of IP addresses dynamically allocated from an IP address provider separated from a pool of statically preassigned IP addresses, if there is no IP address remained unassigned in the pool of statically preassigned IP addresses specifically allocated to the interface, wherein the network element comprises a plurality of interfaces, each interface being associated with a plurality of clients coupled over the access network, wherein each interface is statically allocated with a predetermined range of globally unique IP addresses that can be assigned to any of the clients associated with each interface, and wherein a block of IP addresses is dynamically allocated as a logical interface of a last resort only there is no statically preassigned IP address corresponding to particular interface available; and advertising reachability information in a network with respect to the first block of the IP addresses dynamically allocated from the IP address provider, such that other entities of the network are aware of the first block of the IP addresses.

12. The machine-readable storage medium of claim 11, wherein the IP address provider is one of a DHCP server and a RADIUS server coupled to the network element via a backbone.

13. The machine-readable storage medium of claim 11, wherein the interface is a default interface of the network element.

14. The machine-readable storage medium of claim 11, wherein the method further comprises:
determining whether there is at least one IP address available from the pool of statically preassigned IP addresses; and
dynamically allocating the first block of IP addresses from the IP address provider if there is no IP address available from the pool of statically preassigned IP addresses.

15. The machine-readable storage medium of claim 11, wherein the method further comprises:
receiving from a second client a request for releasing a second IP address previously allocated from the first block of IP addresses; and
releasing the second IP address back to the first block of IP addresses without invoking the IP address provider.

16. The machine-readable storage medium of claim 15, wherein the method further comprises:
receiving a request for allocating a third IP address from a third client; and
reassigning the second IP address from the first block of IP addresses to the third client without invoking the IP address provider.

17. A machine-readable storage medium having executable code to cause a machine to perform a method, the method comprising:
in response to a request for a first IP address received from a first client at an interface of the network element, determining whether there is at least one IP address available from a pool of statically preassigned IP addresses;
determining whether a second block of IP addresses has been previously dynamically allocated from the IP address provider provider to a previous request for an IP address if there is no IP address available from the pool of statically preassigned IP addresses
assigning an IP address from the second block of IP addresses previously allocated if the second block of IP addresses exists and contains at least one IP address available;
dynamically allocating a first block of IP addresses from an IP address provider if there is no IP address available from the pool of statically preassigned IP addresses and there is no IP address available from the second block;
assigning the first client an IP address from the first block of IP addresses dynamically allocated from the IP address provider separated from a pool of statically preassigned IP addresses; and
advertising reachability information in a network with respect to the first block of the IP addresses dynamically allocated from the IP address provider, such that other entities of the network are aware of the first block of the IP addresses.

18. The machine-readable storage medium of claim 17, wherein the first block of IP addresses is dynamically allocated only if the second block of IP addresses does not exist.

19. The machine-readable storage medium of claim 17, wherein the first block of IP addresses is dynamically allocated only if the second block of IP addresses does not contain at least one IP address available.

20. A machine-readable storage medium having excitable code to cause a machine to perform a method, the method comprising:
in response to a request for a first IP address received from a first client at an interface of the network element, assigned the first client an IP address from a first block of IP addresses dynamically allocated from an IP address provider seperated from a pool of statically preassigned IP addresses, if there is no IP address remained unassigned in the pool of statically preassigned IP addresses;
advertising reachability information in a network with respect to the first block of the IP addresses dynamically allocated from the IP address provider, such that other entities of the network are aware of the first block of the IP addresses;
receiving from a second client a request for releasing a second IP address previously allocated from the first block of IP addresses;
releasing the second IP address back to the first block of IP addresses without invoking the IP address provider;
determining whether all IP addresses of the first block of IP addresses have been released; and
releasing the first block of IP addresses back to the IP address provider if all IP addresses of the first block of IP addresses have been released.

21. A network element, comprising:
a processor; and
a memory coupled to the processor to store instructions, when executed by the processor, cause the processor to
in response to a request for a first IP address received from a first client at an interface of the network element. assume the first client an IP address from a first block of IP addresses dynamically allocated from an IP address provider separated from a pool of statically preassigned IP addresses, if there is no IP address remained unassigned in the pool of statically preassigned IP addresses specifically allocated to the interface, wherein the network element comprises a plurality of interfaces, each interface being associated with a plurality of clients coupled over the access network, wherein each interface is statically allocated with a predetermined range of globally unique IP addresses that can be assigned to any of the clients associated with each interface, and wherein a block of IP addresses is dynamically allocated as a logical interface of a last resort only if there is no statically preassigned IP address corresponding to particular interface available, and
advertise reachability information in a network with respect to the first block of the IP addresses dynamically allocated from the IP address provider, such that other entities of the network are aware of the first block of the IP addresses.

22. The network element of claim 21, wherein the interface is a default interface.

23. The network element of claim 21 wherein the IP address provider is one of RADIUS server and DHCP server coupled to the network element through a backbone.

* * * * *